United States Patent
Fuller

(10) Patent No.: US 11,835,152 B2
(45) Date of Patent: Dec. 5, 2023

(54) METHOD AND SYSTEM FOR EXECUTING ONLINE TESTS OF VALVE SEATING INTEGRITY FOR CONTROL VALVES

(71) Applicant: FISHER CONTROLS INTERNATIONAL LLC, Marshalltown, IA (US)

(72) Inventor: John S. Fuller, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 917 days.

(21) Appl. No.: 16/836,519

(22) Filed: Mar. 31, 2020

(65) Prior Publication Data

US 2021/0222794 A1  Jul. 22, 2021

Related U.S. Application Data

(60) Provisional application No. 62/962,917, filed on Jan. 17, 2020.

(51) Int. Cl.
 *F16K 37/00* (2006.01)
(52) U.S. Cl.
 CPC ........ *F16K 37/0041* (2013.01); *F16K 37/005* (2013.01); *F16K 37/0033* (2013.01); *F16K 37/0083* (2013.01)
(58) Field of Classification Search
 CPC ............. F16K 37/0033; F16K 37/0041; F16K 37/005; F16K 37/0083
 See application file for complete search history.

(56) References Cited

U.S. PATENT DOCUMENTS

| | | | |
|---|---|---|---|
| 2012/0139725 A1* | 6/2012 | Grumstrup | F16K 37/0091 702/183 |
| 2015/0149100 A1* | 5/2015 | Eisenbeis | F16K 31/04 702/58 |
| 2017/0082467 A1* | 3/2017 | Nelson | F16K 37/0083 |
| 2019/0383422 A1* | 12/2019 | Wagner-Stuerz | F16K 37/0041 |

FOREIGN PATENT DOCUMENTS

| | | | |
|---|---|---|---|
| EP | 0947901 | * 10/1999 | |
| WO | WO-2010033877 A1 | * 3/2010 | G06F 12/00 |

* cited by examiner

*Primary Examiner* — Atif H Chaudry
(74) *Attorney, Agent, or Firm* — MARSHALL, GERSTEIN & BORUN LLP

(57) ABSTRACT

Systems and methods may be provided to execute online tests of a valve in a digital valve positioner. The digital valve positioner may receive a request to execute a test of the valve, which specifies a test start point, and queue the request for execution. The digital valve positioner may subsequently receive a new setpoint for the valve. The digital valve positioner may further reposition the valve according to the new setpoint. The digital valve positioner may further, while the valve is being repositioned, compare the test start point to a current position of the valve, and in response to determining that the current position of the valve has reached the test start point, collect sensor data indicative of the operation of the valve, to generate results of the test.

19 Claims, 12 Drawing Sheets

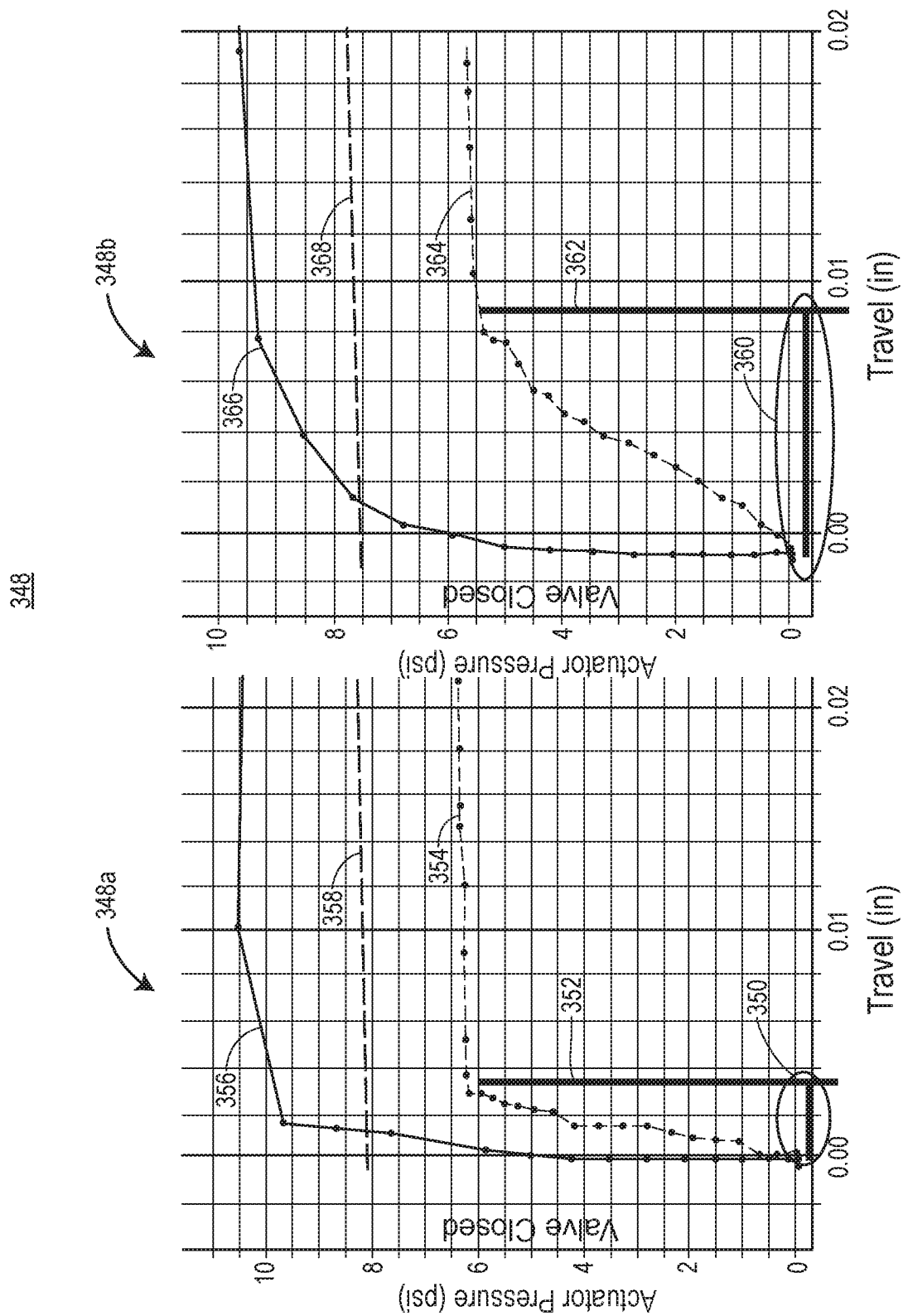

METHOD AND SYSTEM FOR EXECUTING ONLINE TESTS OF VALVE SEATING INTEGRITY FOR CONTROL VALVES

FIELD OF THE DISCLOSURE

The disclosure relates generally to control valves and, and more particularly, to methods and systems for executing online tests of valve seating integrity of control valves.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Process control systems often employ sliding stem valves, such as gate valves, globe valves, diaphragm valves, pinch valves, etc., to control the flow of process fluids. Sliding stem valves typically include a valve body that defines a fluid flow passageway, a valve seat disposed in the fluid flow passageway, a closing element (e.g., a valve plug) which engages the valve seat to close the valve, and a valve stem that operatively couples the closing element to an actuator. In operation, the actuator that moves the closing element relative to the valve seat to control fluid flow through the fluid flow passageway, i.e., close the valve or open the valve to the desired extent. Sliding stem valves often include a sealing element arranged between the valve seat and the valve body to prevent leakage.

When these components engage properly, there is proper valve closure, and the valve has a satisfactory valve seating integrity. However, through repeated use in operations of the process control system the valve components may deteriorate due to normal wear, corrosion, etc. Should the valve seat become substantially deteriorated or fail entirely, the valve will be functionally compromised.

Moreover, such valves can be very large and operating in pipelines and other pathways stretching across vast distances. Taking these systems offline can be highly expensive and time consuming. Simply getting a technician on-site to diagnose, operate, or repair the valve can consume a considerable amount of time. However, conventionally, the only time such evaluations can be made is when the facility is shut down or off-line, or the valve itself is put in bypass mode and isolated from the control system. Thus, performing preventative or remote testing and maintenance of such valves greatly benefits the entire system by avoiding costly breaks in operation.

SUMMARY

The techniques of this disclosure allow testing of the integrity of valve seating while the valve is online. A system can receive a command for initiating a test of the valve seating integrity (a "test request"), queue the command rather than initiate the test immediately, and monitor subsequent commands. When the system receives a command to move the valve through a range of positions that include those specified in the parameters of the test (a "repositioning request"), the system performs the test in accordance with the queued command. Thus, by queuing the request to conduct a valve seating integrity test, the system can execute the test without requiring the valve be taken offline.

Although the examples below refer primarily to sliding stem valves, the techniques of this disclosure also can apply to rotary valves (e.g., ball valves, butterfly valves).

In accordance with one exemplary aspect of the present disclosure, a method in a digital valve positioner is provided for executing online tests of a valve. The method may comprise receiving, by one or more processors, a request to execute a test of the valve, the request specifying test parameters including a test start point; queuing the request for execution; subsequently to receiving the request to execute the test, receiving a new setpoint for the valve; repositioning the valve according to the new setpoint; and while the valve is being repositioned: comparing the test start point to a current position of the valve; and in response to determining that the current position of the valve has reached the test start point, collecting sensor data indicative of the operation of the valve, to generate results of the test. The method may comprise additional, fewer, or alternate actions, including those described herein.

In accordance with another exemplary aspect of the present disclosure, a system is provided for executing online tests of a valve. The system may comprise a position sensor configured to measure a current position of the valve; and a digital valve positioner configured to: receive a request to execute a test of the valve, the request specifying test parameters including a test start point; queue the request for execution; subsequently to receiving the request to execute the test, receive a new setpoint for the valve; reposition the valve according to the new setpoint; and while the valve is being repositioned: compare the test start point to a current position of the valve; and in response to determining that the current position of the valve has reached the test start point, collect sensor data indicative of the operation of the valve, to generate results of the test. The system may comprise additional, fewer, or alternate components and/or functions thereof, including those described herein.

In accordance with another exemplary aspect of the present disclosure, a computer readable storage medium is provided comprising non-transitory computer readable instructions thereon for executing online valve seating integrity tests of a valve. Wherein the instructions, when executed on one or more processors, may cause the one or more processors to receive a request to execute a test of the valve, the request specifying test parameters including a test start point; queue the request for execution; subsequently to receiving the request to execute the test, receive a new setpoint for the valve; reposition the valve according to the new setpoint; while the valve is being repositioned: compare the test start point to a current position of the valve; and in response to determining that the current position of the valve has reached the test start point, collect sensor data indicative of the operation of the valve, to generate results of the test.

In further accordance with any one or more of the foregoing exemplary aspects of the present disclosure, a system, computer readable storage medium, or method in a digital valve positioner for executing online tests of a valve may further include, in any combination, any one or more of the following aspects.

In one aspect, the request is queued for execution in tandem with the new setpoint, and wherein comparing the test start point to current position of the valve further comprises: determining at least one of (i) whether the new setpoint corresponds to a closed position of the valve and (ii) whether the new setpoint corresponds to an open position of the valve; and determining at least one of (i) whether the valve is closed and (ii) whether the current position of the valve is greater than or equal to the test start point.

In another aspect, executing the request in tandem with new setpoint when either: (i) the new setpoint corresponds to the valve being closed and (ii) the current position of the valve is greater than or equal to the test start point; or (i) the new setpoint corresponds to the valve being open and (ii) the valve is closed; and maintaining the request in the queue if either: (i) the new setpoint corresponds to the valve being closed and (ii) the current position of the valve is less than the test start point; or (i) the new setpoint corresponds to the valve being open and (ii) the valve is not closed.

In another aspect, the request further specifies a ramp rate, the new setpoint comprises a first new setpoint, and executing the request further comprises: receiving a second new setpoint for the current position of the valve; and at least one of: ramping the valve closed based on the ramp rate until either of (i) the new setpoint does not correspond to the valve being closed, or (ii) the current position of the valve is static; and ramping the valve open based on the ramp rate until the current position of the valve is greater than or equal to either of (i) the second new setpoint, or (ii) the test start point.

In another aspect, the request further specifies a testing frequency, and wherein executing the request further comprises: when the new setpoint commands the valve to open while ramping the valve closed according to the first new setpoint: canceling the request; and re-queuing the request for execution according to the testing frequency; and when the second new setpoint corresponds to the valve being closed while ramping the valve open according to the first new setpoint: canceling the request; and re-queuing the request for execution according to the testing frequency.

In another aspect, the method further comprises at least one of comparing the sensor data to stored data to produce a first result, wherein the stored data represents one or more prior satisfactory requests, and wherein the first result includes information including at least one of (i) a first slope of the sensor data, (ii) a first rounding of the sensor data, and (iii) a first seat engagement based on the sensor data; and comparing the sensor data to one or more factory norms to produce a second result, wherein the one or more factory norms represent one or more established satisfactory criteria, and wherein the second result includes information including at least one of (i) a second slope of the sensor data, (ii) a second rounding of the sensor data, and (iii) a second seat engagement based on the sensor data.

In another aspect, the method further comprises generating an alert based on the first or second result, depending on the quality of the valve trim.

In another aspect, the sensor data includes at least the current position of the valve and at least one of (i) a pressure measurement and (ii) a force measurement (e.g., using any suitable type of a load cell).

BRIEF DESCRIPTION OF THE DRAWINGS

The techniques of this disclosure may be best understood by reference to the following description taken in conjunction with the accompanying drawings, in which like reference numerals identify like elements in the several FIGS., in which:

FIG. 3C illustrates an example normal seat profile and a seat profile with a potential seat engagement problem;

DETAILED DESCRIPTION

Generally speaking, the techniques of the present disclosure allow a system to efficiently execute online valve seating integrity tests of a control valve. For clarity, an example system that includes a valve controller that executes tests of valve seating integrity in accordance with these techniques is briefly discussed with reference to FIG. 1. Examples of valve seating integrity tests are then discussed with reference to FIGS. 2A-3E, and methods for configuring and executing online valve seating integrity tests are discussed with reference to FIGS. 4-8.

EXAMPLE SYSTEM

Figure 1:
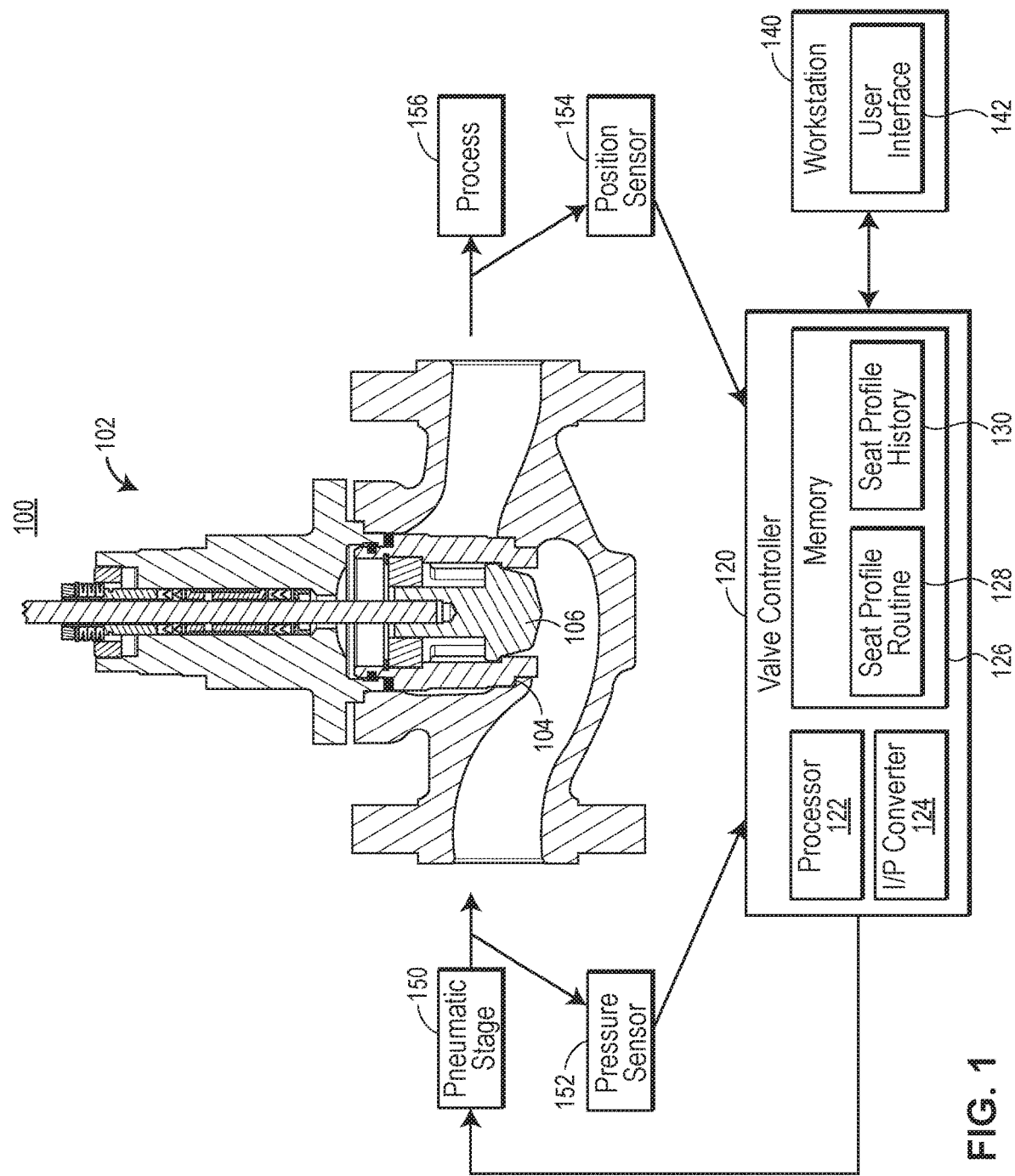
FIG. 1 is a block diagram showing one example of a control valve positioning system configured to execute an online test of a valve in accordance with the principles of the present disclosure.

Referring first to FIG. 1, an example system 100 includes a valve 102 configured to control fluid flow in a process 156. A pneumatic stage 150 can include a pneumatic positioner and actuator or a pneumatic relay and/or an actuator. The pneumatic stage 150 generates a signal to position a moveable closing element (e.g., valve plug 106) of the valve 102 to thereby restrict or increase the flow of process fluid by engaging or disengaging the valve plug 106 with the valve seat 104.

A digital valve positioner 120 (or simply "valve positioner 120") can control the valve 102 via the pneumatic stage 150. The valve positioner 120 can receive signals indicative of pressure and valve travel from a pressure sensor 152 and a position sensor 154, respectively. The sensors 152 and 154 can be implemented using any suitable components, including those currently known in the art.

Although the examples in this disclosure refer to actuator pressure, in general the valve positioner 120 can use any suitable force measurement (e.g., pressure multiplied by the actuator area) from a suitable load sensor. In some implementations, the type of load sensor from which the valve positioner 120 receives the force measurement depends on the type of the valve actuator, e.g., electric, electrohydraulic.

As illustrated in FIG. 1, the valve positioner 120 includes a processor 122, a current-to-pressure (I/P) converter 124, and a memory 126 storing a seat profile routine 128. The memory 126 can include a non-transitory medium readable by the processor 122, and the seat profile routine 128 can include instructions executable by the processor 122, in any suitable programming language. The memory 126 also can store seat profile history 130, such as prior valve seating integrity tests, as explained below.

A workstation 140 in this example configuration is coupled to the valve positioner 120 to allow an operator to configure a test request for the valve 102, send a test request to the valve positioner 120, monitor test progress, etc. The workstation 140 may include one or more processors, a memory readable by the one or more processors, and a user interface 142 such as a touchscreen, a conventional screen with a keyboard, etc. The workstation 140 can communicate with the valve positioner 120 over any suitable number of wired or wireless communication links.

Example Valve Seating Integrity Tests and Analysis

Figure 2A:
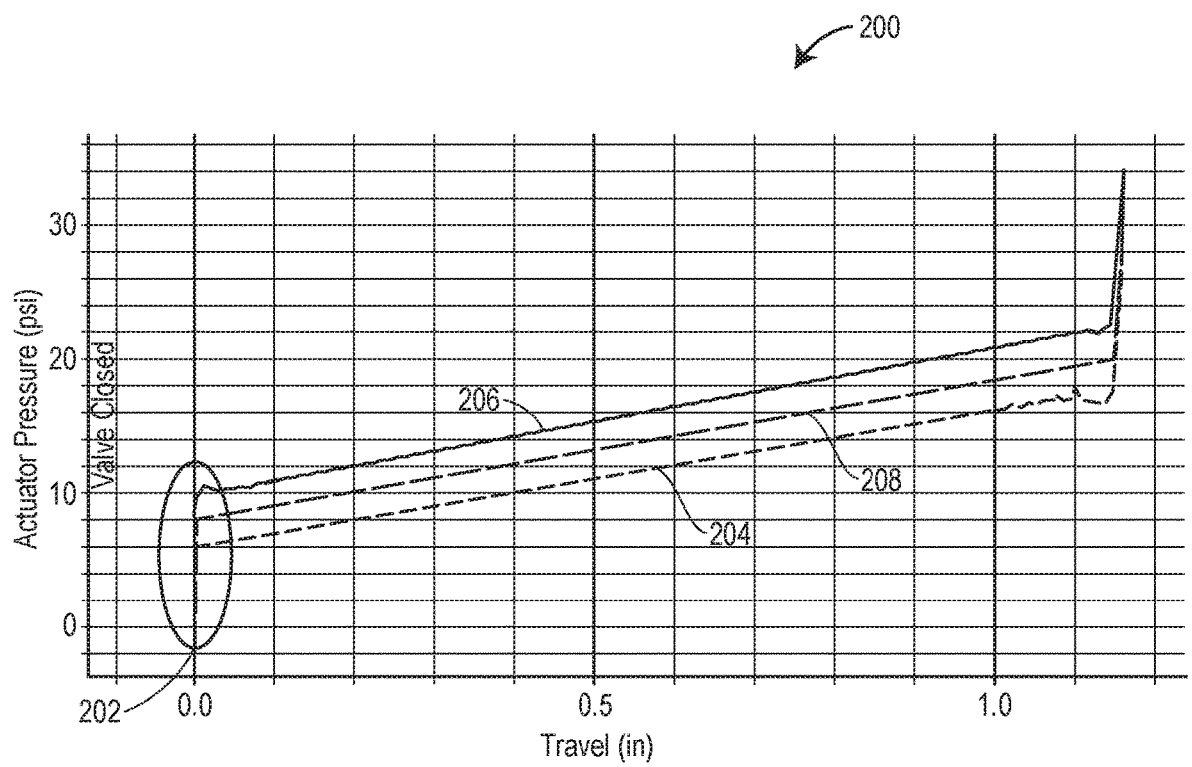
FIG. 2A illustrates example valve position values plotted against pressure values, corresponding to a valve signature of the control valve of FIG. 1.
Figure 2B:
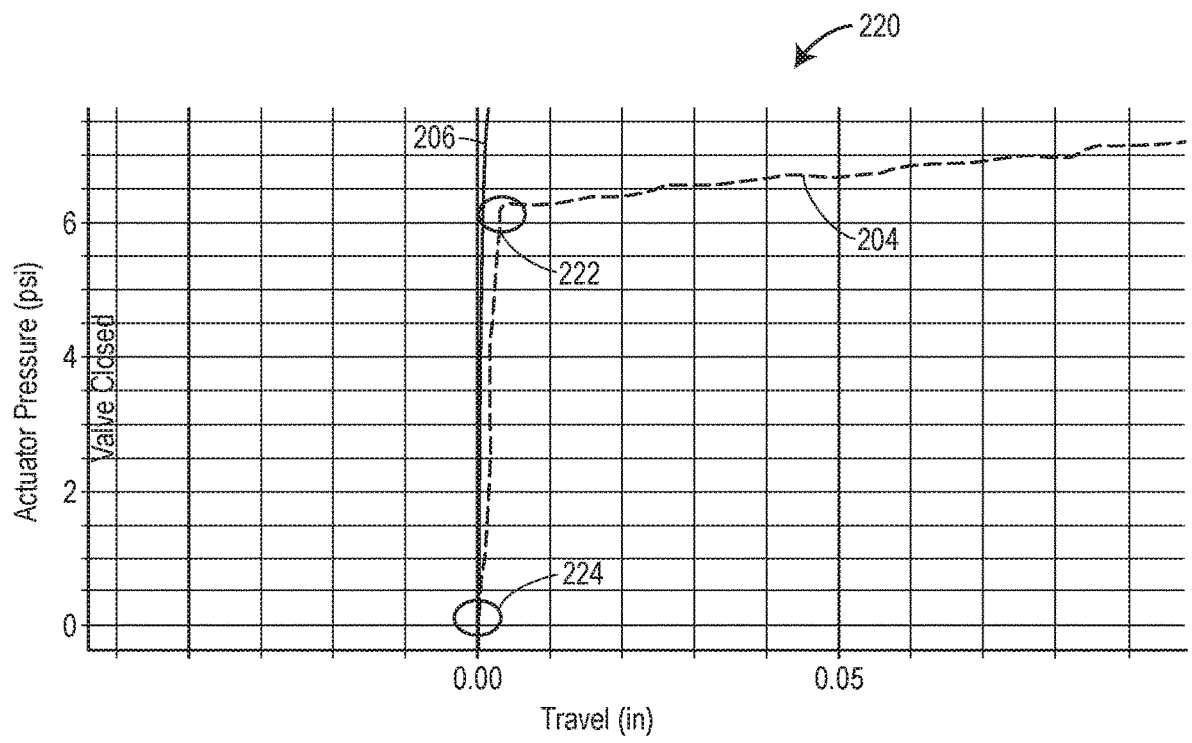
FIG. 2B is a plot of a subset of the data of FIG. 2A, corresponding to a seat profile of the control valve of FIG. 1.

FIG. 2A is a plot 200 of valve position versus actuator pressure, corresponding to a valve signature of the valve 102. Generally speaking, the valve in this scenario initially is in either a completely open or completely closed configuration. If, for example, the valve is initially completely open, then the valve positioner 120 ramps the valve to the completely closed position and then ramps the valve to the completely open position again. The plot 200 also illustrates a zero-friction line 208, using which seat profile routine 128 can determine the amount of friction generated by moving the valve plug 106 in accordance with the closing seat profile 204 or in accordance the opening seat profile 206.

In a region 202, as the valve plug 106 approaches and engages the valve seat 104, the valve position and the corresponding actuator pressure values define a seat profile. As best illustrated in the plot 220 of FIG. 2B (corresponding to the region 202 in FIG. 2A), the valve plug 106 approaches and initially contacts the valve seat 104 in a first region 222. Once the closing seat profile 204 reaches the first region 222, and as discussed further below, there is a characteristic pressure drop from the first region 222 to a second region 224 (a large pressure or force change with little or no movement as compared to the time prior to first region 222). This characteristic pressure drop is represented by the steep slope of the plot 220 between the first region 222 and the second region 224. Both the first region 222 and the second region 224 are illustrated approximately and are included in this disclosure for purposes of clarity. The second region 224 may, for example, approximately indicate where the valve plug 106 has fully engaged the valve seat 104. Similarly, and as further discussed below, there is a corresponding rise in pressure associated with the beginning of the opening cycle 206 (a large Increase in pressure or force change with little or no movement, to overcome the spring force).

It will be appreciated that the characteristic pressure changes with respect to position described above in reference to FIGS. 2A and 2B may not always occur in a substantially similar manner. For example, the valve 102 may experience a failed open instance where the valve plug 106 is in the completely closed configuration (e.g., similar to the position represented in the second region 224), but the actuator pressure may be at a maximum. As the valve opens, or attempts to open, the actuator pressure may decrease from the maximum value, but in any event may not appear substantially similar to the profiles illustrated in FIGS. 2A and 2B.

Generally speaking, the seat profile routine 128 can monitor the slope of the seat profile to determine whether the slope remains substantially (e.g., within a certain margin of error E) constant after the valve plug 106 makes first contact with the valve seat 104 until the end of the closing cycle (e.g., closing cycle 204). When the seat profile routine 128 determines that the seat profile does not exhibit these characteristic sharp rises and drops in pressure, the seat profile routine 128 can determine that various potential problems associated with the quality or integrity of the valve seat 104 may exist.

Figure 3A:
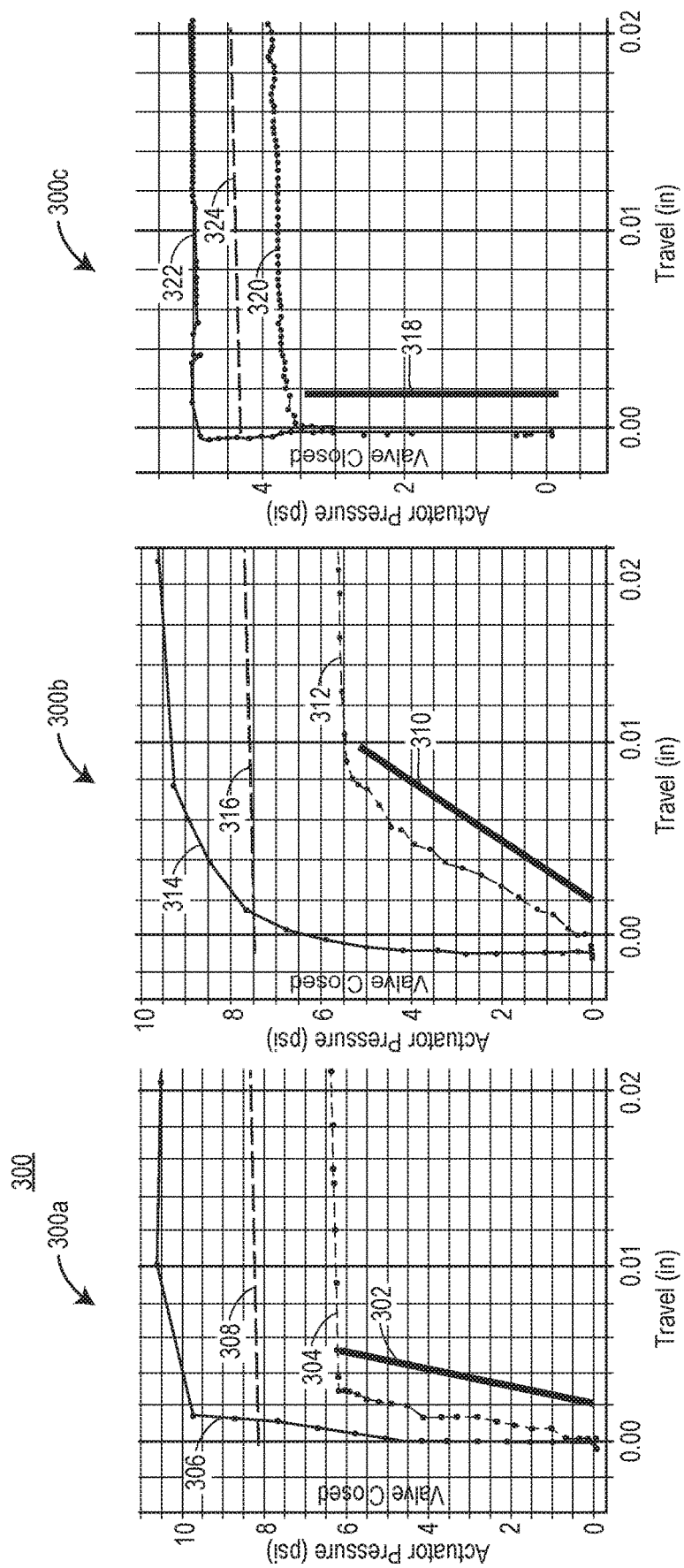
FIG. 3A illustrates valve position values plotted against respective pressure values to illustrate several example seat profiles, in several scenarios.

For example, FIG. 3A is a set of graphs 300 of valve position values plotted against actuator pressure values, illustrating several example slopes of a seat profile in different scenarios. In a first plot 300a, a line segment 302 represents the slope of a closing seat profile 304. The first slope plot 300a additionally includes an opening seat profile 306 and a zero-friction line 308. As shown, the line segment 302 corresponds to a "normal" slope (i.e., the valve plug 106 contacts the valve seat 104 as expected) for the closing seat profile 304. In other words, the seat profile routine 128 may monitor the slope of the closing seat profile 304 from the point of first contact of the valve plug 106 with the valve seat 104 to the end of the closing seat profile 304 such that the seat profile routine 128 may determine the slope of the closing seat profile 304 does not indicate any likely problem with the integrity of the valve seat.

The end of the closing seat profile 304 (or indeed, any of the seat profiles described below) may be determined by when the seat profile routine 128 receives an actuator pressure value from the pressure sensor 152 that is above/below a threshold value, or when the seat profile routine 128 receives a valve position value from the position sensor 154 that is above/below a threshold value, or both. Alternatively or additionally, the end of the closing seat profile 304 may be determined by when the seat profile routine 128 determines (e.g., via processor 122) a slope value between two points of the closing seat profile 304 that is above/below a threshold value.

In a second plot 300b, a line segment 310 represents the slope of a closing seat profile 312. The second plot 300b additionally includes an opening seat profile 314 and a zero-friction line 316. As shown, the line segment 310 corresponds to an "abnormal" slope (i.e., the valve plug 106 contacts the valve seat 104 in an unexpected fashion) for the closing seat profile 312. In other words, the seat profile routine 128 may monitor the slope of the closing seat profile 312 from the point of first contact of the valve plug 106 with the valve seat 104 to the end of the closing seat profile 312 such that the seat profile routine 128 may determine the slope of the closing seat profile 312 does indicate a likely problem with the integrity of the valve seat.

In a third plot 300c, a line segment 318 represents the slope of a closing seat profile 320 is represented by a line segment 318. The third plot 300c additionally includes an opening seat profile 322 and a zero-friction line 324. As shown, the line segment 318 corresponds to a nearly vertical slope for the closing seat profile 320. In this circumstance, the seat profile routine 128 may monitor the slope of the closing seat profile 320 from the point of first contact of the valve plug 106 with the valve seat 104 to the end of the closing seat profile 320 and determine the valve 102 reached a mechanical stop before the valve plug 106 reached the valve seat 104. For example, the mechanical stop may be the valve's actuator reaching the bottom of its casing before the valve plug 106 fully engaged the valve seat 104. However, it should be understood that the slope of either the opening cycle (e.g., opening cycle 206) or the closing cycle (e.g., closing cycle 204) for any valve profile may be indicative of various types of damage to the valve seat or lack thereof.

Moreover, the slope of the seat profile may appear normal, but problems with the valve seat 104 may still exist. The relative sharpness of the point of first contact between the valve plug 106 and the valve seat 104 may be indicative of various types of potential damage even when the slope is not obviously irregular.

Figure 3B:
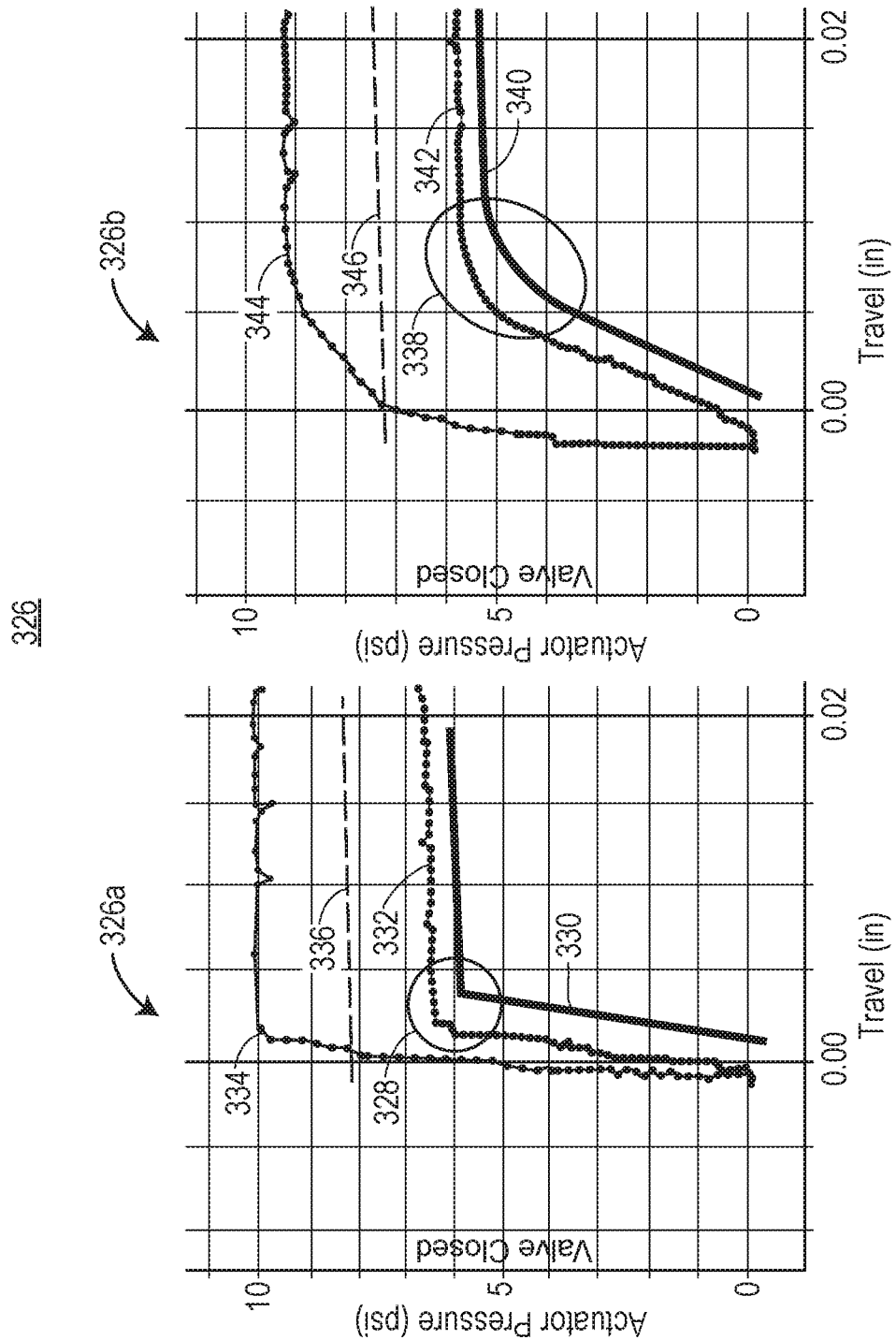
FIG. 3B illustrates an example normal seat profile and a seat profile with excessive "rounding," which can be indicative of damage to the valve seat.

For example, FIG. 3B is a set of graphs 326 of valve position values plotted against actuator pressure values, illustrating rounding of a seat profile. A first plot 326a includes a (approximate) region 328, a line segment 330, and a closing seat profile 332. The first plot 326a additionally includes an opening seat profile 334 and a zero-friction line 336.

Generally, identifying "rounding" of the seat profile refers to the seat profile routing 128 analyzing the change, X, in slope of the seat profile around the point of initial contact between the valve plug 106 and the valve seat 104 (e.g., region 328). For example, the seat profile routine 128 may monitor X concurrently with the slope of line segments connecting consecutive data points along a particular seat profile (as represented by, for example, the line segment 330 corresponding to seat profile 332). If X satisfies a threshold value (e.g., X>=1), then the seat profile routine 128 may identify the associated point of initial contact as "sharp." In these instances, the seat profile routine 128 may additionally identify the associated seat profile as "healthy," and thus may further identify the associated valve seat 104 as "healthy." By contrast, if X does not satisfy the threshold value (e.g., X<1), then the seat profile routine 128 may identify the associated point of initial contact as "rounded." Accordingly, the seat profile routine 128 may additionally identify the associated seat profile as "damaged," and thus may further identify the associated valve seat 104 as "damaged."

To illustrate, in the first plot 326a, the region 328 may exhibit a "sharp" corner because the change, X, in slope of the closing seat profile 332 around the region 328 may satisfy a threshold value. Hence, the seat profile routine 128 which may additionally identify the closing seat profile 332 as "healthy," and thus may further identify the valve seat 104 corresponding to the closing seat profile 332 as "healthy."

By contrast, a second plot 326b includes a (approximate) region 338, a line segment 340, and a closing seat profile 342. The second plot 326b additionally includes an opening seat profile 344 and a zero-friction line 346.

Here, the region 338 may exhibit a "rounded" corner because the change, X, in slope of the closing seat profile 342 around the region 338 may not satisfy a threshold value. Hence, the seat profile routine 128 which may additionally identify the closing seat profile 342 as "damaged," and thus may further identify the valve seat 104 corresponding to the closing seat profile 342 as damaged.

An additional indication that the valve seat 104 may be damaged, which the seat profile routing 128 can automatically detect based on valve position and pressure readings, is an excessively long seat engagement. As used herein, "seat engagement" describes the physical distance, Y, the valve plug 106 travels between first contacting the valve seat 104 and fully engaging the valve seat 104, thereby stopping the valve plug's 106 movement.

For example, the seat profile routine 128 may monitor the valve position from a point of initial contact between the valve plug 106 and the valve seat 104 (e.g., first region 222) to the end of the seat profile (e.g., second region 224) to determine Y corresponding to the valve plug 106 during this process. If Y satisfies a threshold value (e.g., Y<0.010"), then the seat profile routine 128 may identify the associated seat profile as "normal." In these instances, the seat profile routine 128 may additionally identify the associated valve seat 104 as "healthy." By contrast, if Y does not satisfy the threshold value (e.g., Y>=0.010"), then the seat profile routine 128 may identify the associated seat profile as "damaged," and thus may further identify the associated valve seat 104 as "damaged."

FIG. 3C is a combination of plots 348 of valve position versus actuator pressure readings, illustrating seat engagement issues associated with an example seat profile. A first plot 348a includes a displacement 350, a pressure depth 352 (available force for shutoff), and a closing seat profile 354. The first plot 348a additionally includes an opening seat profile 356 and a zero-friction line 358. In this case, the seat profile routine 128 may identify the closing seat profile 354 as "normal" because the displacement 350 may satisfy a threshold value. Hence, the seat profile routine 128 may additionally identify the valve seat 104 corresponding to the closing seat profile 354 as "healthy."

A second plot 348b includes a displacement 360, a pressure depth 362 (available force for shutoff), and a closing seat profile 364. The second plot 348b additionally includes an opening seat profile 366 and a zero-friction line 368. Here, the seat profile routine 128 may identify the closing seat profile 364 as "damaged" because the displacement 360 may not satisfy a threshold value. Hence, the seat profile routine 128 may additionally identify the valve seat 104 corresponding to the closing seat profile 364 as "damaged."

Thus far, the seat profile routine 128 has identified potential damage to a valve seat (e.g., valve seat 104) by analyzing closing cycles (e.g., closing seat profile 204, 304, 312, 320, 332, 342, 354, and 364) of a valve signature test. However, it should be understood that the seat profile routine 128 may also identify potential damage to the valve seat by analyzing opening cycles (e.g., opening seat profile 206, 306, 314, 322, 334, 344, 356, and 366) of the valve signature test. In addition to the indications discussed above, a valve plug (e.g., valve plug 106) may, for example, stick in a valve seat (e.g., valve seat 104) during an opening cycle (e.g., opening cycle 206).

When the valve positioner 120 causes the valve to open, there is a slight lag in response due to a couple of factors: filling the actuator volume, overcoming the force required to provide tight shutoff, overcoming static friction. Thus, while the force is increasing, the valve is not moving. After the force required for shutoff has been met and static friction has been overcome, the valve will start to move. The force required to overcome static friction is greater than dynamic friction, which results in rapid movement of the valve in excess of the ramp rate due to the excess force and potential lagging behind the commanded signal. The valve positioner 120 than decreases the force rapidly so that the travel does not overshoot the commanded signal. All of these factors create what is referred to as a "bubble" in the opening profile. This is normal for most valves. The size of the "bubble" is directly related to the ramp rate, the force to overcome static friction, and the speed at which the valve controller is able to correct the situation. Thus, the size of the bubble typically relates directly to static friction, or the plug sticking in the seat, since the ramp rate and valve controllers ability to correct the situation are normally constant. If the valve sticks in the valve seat during the initial stages of an opening operation, the bubble may be quite pronounced and even form a "loop".

Hence, as used herein, the term "sticking" or "stick" in the valve seat refers to the valve plug (e.g., valve plug 106) remaining fully engaged with the valve seat (e.g., valve seat 104), to form a larger "bubble" as discussed above. For example, the seat profile routine 128 may monitor the length of time, Z, the valve plug remains fully engaged with the valve seat after the opening cycle begins. If Z exceeds a threshold value by a certain percentage, e.g., 10%, 15%, 20%, then the seat profile routine 128 may identify the associated seat profile as "damaged." In these instances, the seat profile routine 128 may additionally identify the associated valve seat 104 as "damaged." By contrast, if Z does not exceed the threshold value by the certain percentage, then the seat profile routine 128 may identify the associated seat profile as "normal," and thus may further identify the associated valve seat 104 as "normal."

Figure 3D:
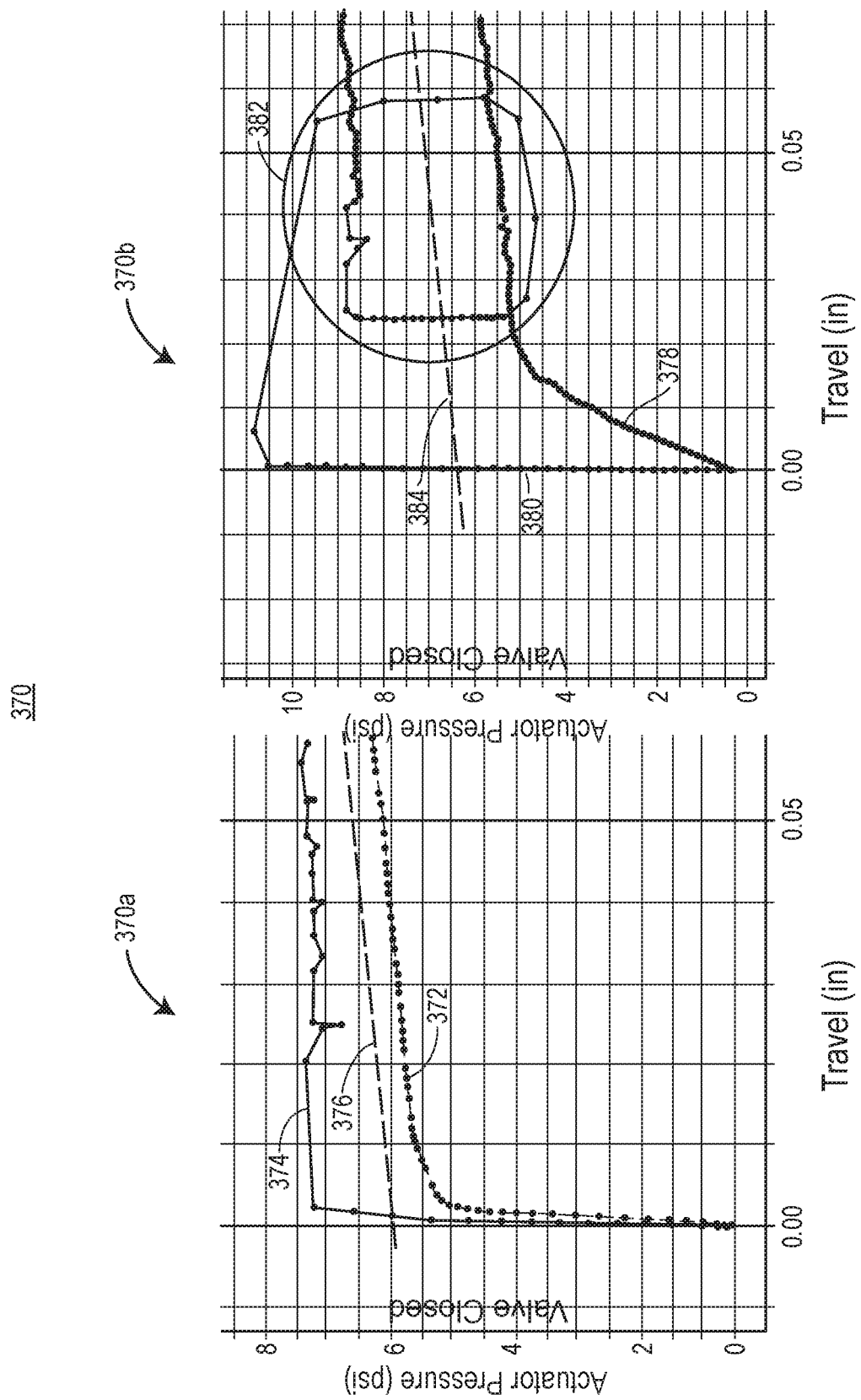
FIG. 3D illustrates an example normal seat profile and a seat profile in which the valve sticks in the valve seat.
Figure 3E:
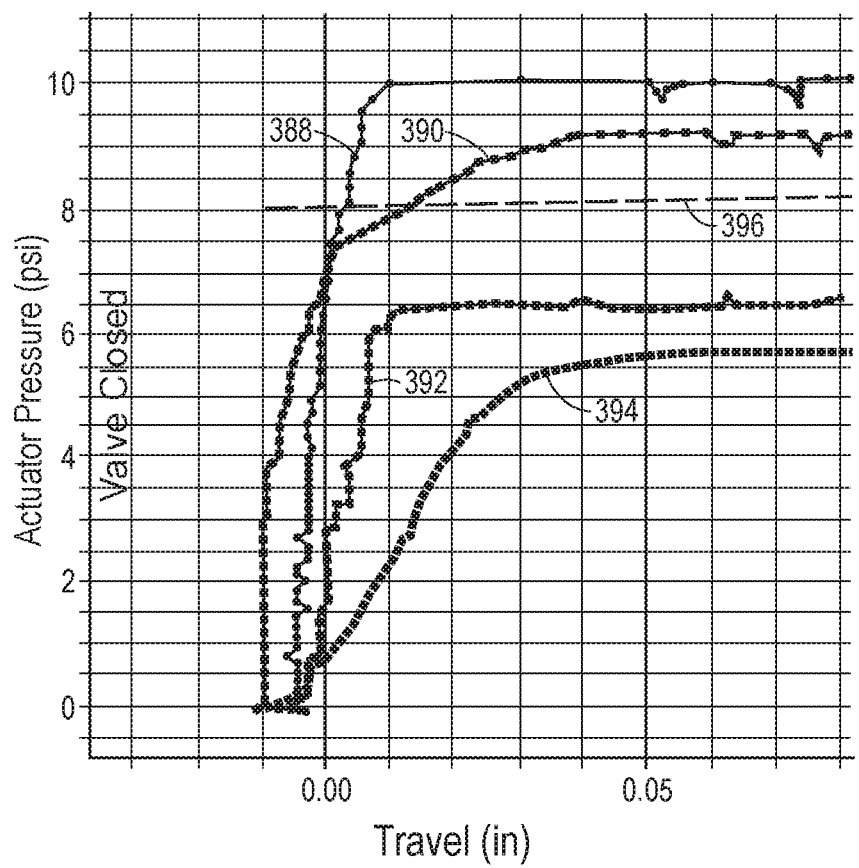
FIG. 3E illustrates a combination of multiple valve seating integrity tests for an example control valve.

FIG. 3D is a combination of plots 370 of valve position versus actuator pressure highlighting a seat profile including the valve plug 106 sticking in the valve seat 104. A first plot 370a includes a closing seat profile 372, an opening seat profile 374, and a zero-friction line 376. Here, the seat profile routine 128 may identify the opening seat profile 374 as "normal," because Z did not exceed a threshold value by a certain percentage. Accordingly, the seat profile routine 128 may additionally identify the valve seat 104 corresponding to the opening seat profile 374 as "normal."

A second plot 370b includes a closing seat profile 378, an opening seat profile 380, a region 382, and a zero-friction line 384. In this case, the seat profile routine 128 may identify the opening seat profile 380 as "damaged" because Z exceeded a threshold value by a certain percentage. Accordingly, the seat profile routine 128 may additionally identify the valve seat 104 corresponding to the opening seat profile 380 as "damaged."

Moreover, the seat profile routine 128 may identify the opening seat profile 380 and the valve seat 104 as "damaged" based on the valve position and actuator pressure values associated with the opening seat profile 380. To illustrate, the region 382 includes consecutive valve position values indicating the valve plug's 106 movement in a direction opposite that of the direction indicated in the valve controller's 120 command. The seat profile routine 128 may determine the valve plug 106 was sticking to the valve seat 104 based on these consecutive valve position values, and thus indicate both the opening seat profile 380 and the valve seat 104 are "damaged.".

With these various indications of potential damage to the valve seat in mind, an example comparison of multiple valve seating integrity tests is presented in FIG. 3D, in accordance with various embodiments of the present disclosure. The plot 386 of FIG. 3D includes a first composite opening seat profile 388, a first composite closing seat profile 392, a second composite opening seat profile 390, a second composite closing set profile 394, and a composite zero-friction line 396.

As further discussed below, the seat profile routine 128 may analyze multiple valve signature tests, particularly the seat profiles, to determine how closely a current test matches a known "good" test or established factory norms based on the valve construction. For example, the seat profile routine 128 may determine that the seat profile exhibited by both the second composite closing seat profile 394 and the second composite opening seat profile 390 describes a valve seat that is damaged when compared with the first composite closing seat profile 392 and the first composite opening seat profile 388, respectively. The seat profile routine 128 may make this determination, at least in part, based on the evaluation and analysis techniques described herein.

Methods for Configuring, Queuing, and Executing Online Valve Seating Integrity Tests Consistent with the system and analytical points previously described in the present disclosure, a user may wish to test the seat profile of a process control valve (e.g., valve 102). As described herein, various methods for configuring, queuing, and executing such a test allow seat profiles to be determined without taking the valve offline.

Figure 4:
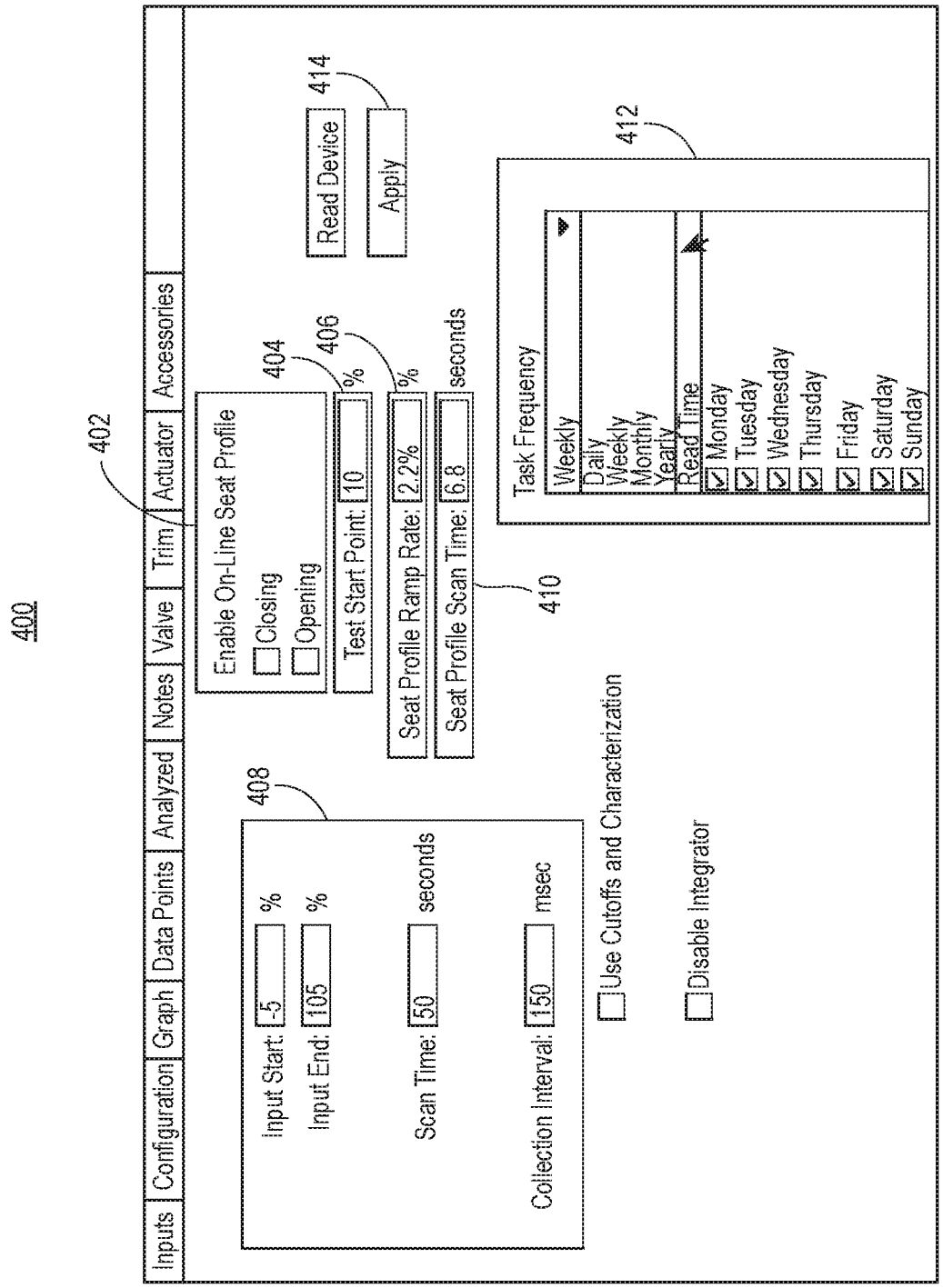
FIG. 4 is an example graphical user interface (GUI) for configuring a test request, which the system of FIG. 1 can present to an operator.

FIG. 4 is an example graphical user interface (GUI) 400 for configuring a test request. Generally speaking, the GUI 400 allows a user at, for example, a workstation (e.g., workstation 140) to specify certain parameters concerning a valve seating integrity test that is then uploaded to a valve controller (e.g., valve positioner 120). The GUI 400 includes an enabling section 402, a test start point section 404, a seat profile ramp rate section 406, and a seat profile scan time section 410. The enabling section 402 may provide a user with an option to enable a valve seating integrity test during a closing cycle (e.g., closing seat profile 204), an opening cycle (e.g., opening seat profile 206), or any combination thereof, by selecting the appropriate box or indicator.

The test start point section 404 provides a user with an option to enter a test start point. The test start point may be based on the amount of travel necessary to establish a seat profile that may be analyzed. For example, it may be necessary to have the valve plug 106 travel at least from 10% open to fully closed to get a seat profile that may be analyzed. In this example, the user may enter 10% into the test start point section 404 to have the system record or analyze data starting from when the valve 102 is 10% open to when the valve 102 is fully closed. Moreover, the system (e.g., seat profile routine 128) may impose unique guidelines for the test start point for each type of valve.

The seat profile ramp rate section 406 provides a user with an option to enter a seat profile ramp rate. The seat profile ramp rate is calculated by taking an established scan time for a total scan (i.e., valve signature test, as shown in FIG. 1) and determining a ramp rate for the total scan. The established scan time for a valve may be based on, for example, the diaphragm area for spring and diaphragm actuators and the piston area for piston actuators. For example, as shown in a total scan section 408, a typical total scan may be run from −5% initial valve plug travel to 105% final valve plug travel. In this example, the total scan may be run with a scan time of 50 seconds for an actuator diaphragm area of up to 100 square inches. The system (e.g., seat profile routine 128) may then calculate the ramp rate as, for example:

$$\frac{\text{Final valve plug travel} - \text{Initial valve plug travel}}{\text{Scan time}} =$$

$$\frac{105\% - (-5\%)}{50 \text{ seconds}} = 2.2\%/\text{sec}$$

The seat profile scan time section 410 provides the user with an option to enter a seat profile scan time. Alternatively, the system may automatically populate the seat profile scan time. In either case, the seat profile scan time indicates approximately how long the valve seating integrity test will take to execute. For example, the system (e.g., seat profile routine 128) may calculate the seat profile scan time as follows:

$$\frac{\text{Test start point} - \text{Initial valve plug travel}}{\text{Ramp rate}} = \frac{10\% - (-5\%)}{2.2\%/\text{sec}} = 6.82 \text{ seconds}$$

The GUI 400 may also include a testing frequency section 412. The testing frequency section 412 includes multiple options for a user to select a frequency for conducting valve seating integrity tests for a particular valve. For example, the testing frequency section 412 may have a drop-down menu listing various frequencies (i.e., daily, weekly, monthly, yearly, next time the valve closes/opens etc.). Moreover, the testing frequency section 412 may include an option for the user to select specific days of the week to conduct valve seating integrity testing. Additionally, the testing frequency section 412 may include options for the user to specify periods of time they prefer to have the testing completed. If, for example, the user knows the valve is more likely to be moved at a certain date or time, these options allow the user to more optimally queue the valve seating integrity tests for execution.

The GUI 400 may also include an uploading command 414. The uploading command 414 may allow the user to download the test request to the valve positioner 120 for queuing and execution in accordance with the parameters described herein.

Figure 5:
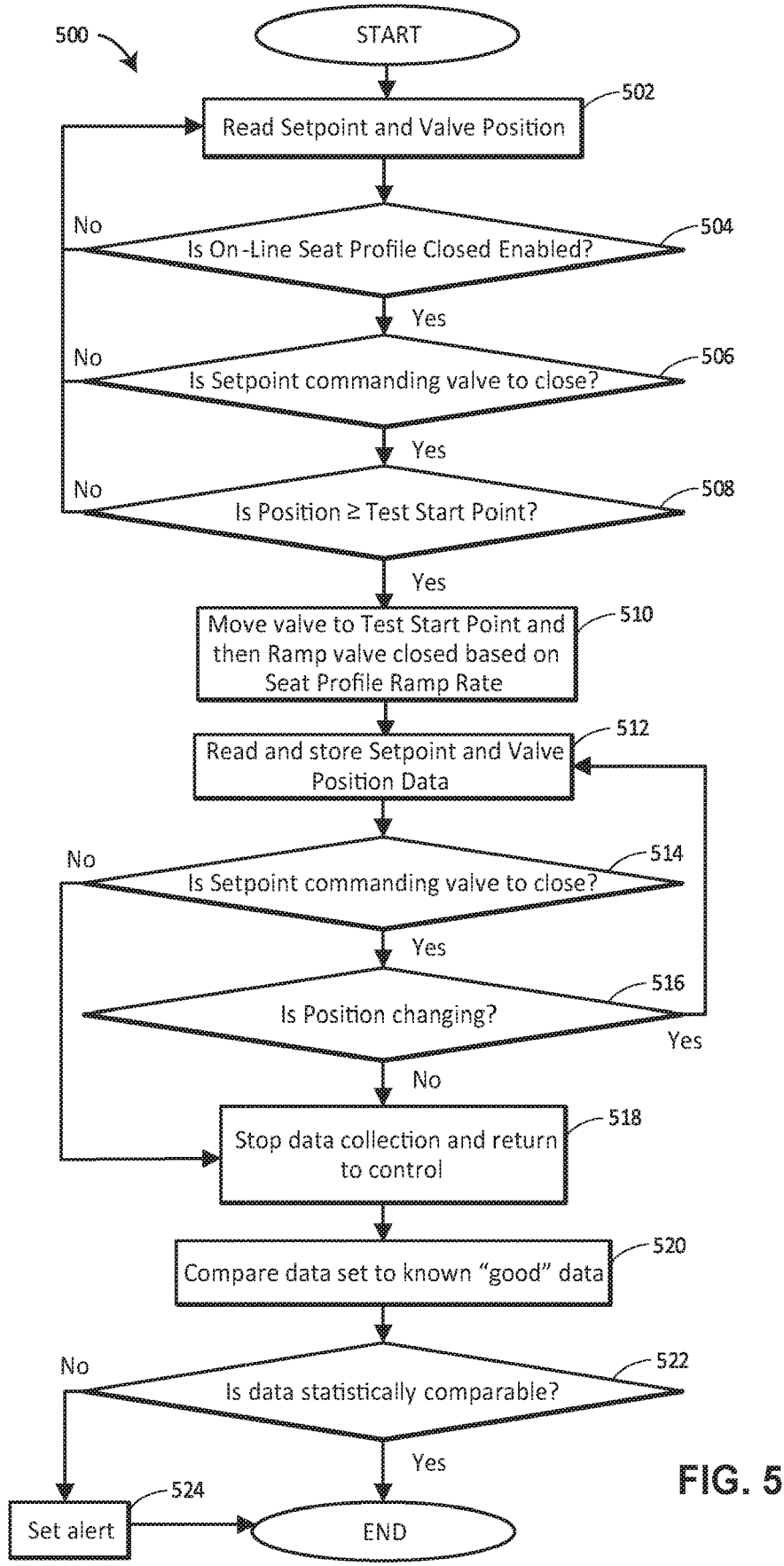
FIG. 5 is a flow diagram of an example method of executing an online test of opening the valve of FIG. 1, in accordance with the principles of the present disclosure.

Once the valve positioner 120 has configured and downloaded the parameters of the valve seating integrity test, the valve positioner 120 queues the test for subsequent execution. FIG. 5 is a process flowchart showing one example of a method 500 of executing an online test of closing of a control valve in accordance with the techniques of this disclosure. The method 500 begins at block 502 where the valve positioner 120 reads and stores a setpoint and valve position of the valve. The setpoint may refer to, for example, an ending position of the valve plug based on a command request received by the valve positioner 120. The valve position may refer to, for example, a current position of the valve plug 106, as measured by the position sensor 154. The system (e.g., valve positioner 120) may collect and store the setpoint and valve position data based on the frequency settings established by the user, for example, in the testing frequency section 412.

At block 504, the method 500 includes determining whether an online seat profile closed option is enabled. For example, the valve positioner 120 may check the testing configuration submitted by the user, and more specifically, the options chosen in the enabling section 402. If the closing option was selected, the method 500 continues to block 506; otherwise, the method returns to block 502.

At block 506, the method 500 includes determining whether the valve positioner 120 is commanding the valve to close by executing a command request specifying a new setpoint for the valve. For example, the valve positioner 120 may check the command request to determine if the valve positioner 120 is commanding the valve to close based on the current position of the valve and the setpoint specified in the command request. To illustrate, if the valve is currently positioned at 45% open, and a command request includes a setpoint of 0% open for the valve, the valve positioner 120 would determine the valve positioner 120 is commanding the valve to close by executing the command request specifying the setpoint of 0% open. If the valve positioner 120 is commanding the valve to close, the method 500 continues to block 508; otherwise, the method 500 returns to block 502.

At block 508, the method 500 includes determining whether the position of the valve is greater than or equal to the test start point. For example, the valve positioner 120 may check the testing configuration submitted by the user, and more specifically, the option specified in the test start point section 404. The valve positioner 120 may then compare this value to the position of the valve, as obtained, for example, from the position sensor 154. If the position of the valve is greater than or equal to the test start point, the method 500 continues to block 510; otherwise, the method 500 returns to block 502. In some implementations, block 508 is executed prior to block 506.

At block 510, the method 500 includes moving the valve to the test start point and then ramping the valve closed based on the seat profile ramp rate. As previously mentioned, the test start point may be obtained from the test start point section 404 of the testing configuration submitted by the user. Similarly the valve positioner 120 may obtain the seat profile ramp rate from the testing configuration submitted by the user, and more specifically, from the seat profile ramp rate section 406.

To illustrate, at block 510, the valve positioner 120 may execute the command request until the test start point is reached. Once the test start point is reached, the valve positioner 120 may continue to ramp the valve closed, but may do so at the seat profile ramp rate specified by the user in the seat profile ramp rate section 406. However, it is to be understood that the valve controller may ramp the valve closed prior to and after the valve seating integrity test is complete at any suitable rate.

At block 512, the method 500 includes reading and storing a setpoint and valve position of the valve. Similar to block 502, the valve positioner 120 may obtain the setpoint data from the command request, and the valve position from the position sensor 154.

At block 514, the method 500 includes determining whether the valve positioner 120 is commanding the valve to close by executing a command request specifying a new setpoint for the valve. Similar to block 506, for example, the valve positioner 120 may check the command request to determine if the valve positioner 120 is commanding the valve to close based on the current position of the valve and the setpoint specified in the command request. In this way, the valve positioner 120 may check if the command request initially requesting the valve to close is still the operative command request. In other words, if the valve positioner 120 receives a subsequent command request specifying a setpoint that would open the valve while the valve positioner 120 is executing the prior command request (i.e., the command request initially received prior to block 502), the subsequent command request may take priority, and the valve seating integrity test may be terminated. If the valve seating integrity test is terminated in this way, the valve positioner 120 may store the data associated with the valve seating integrity test in, for example, the seat profile history 130 of the valve controller's 120 memory 126. The valve positioner 120 may then mark the seat profile data as a terminated valve seating integrity test, and the valve positioner 120 may not conduct an automatic evaluation, as discussed herein. If the valve positioner 120 is commanding the valve to close by executing a command request specifying a new setpoint for the valve, the method 500 continues to block 516; otherwise, the method 500 continues to block 518.

At block 516, the method 500 includes determining whether the valve position is changing. For example, the valve positioner 120 may obtain a reading from the position sensor 154 at a first time and obtain a reading from the position sensor 154 again at a second time to determine if the valve position is changing. If the valve position is changing, the method 500 returns to block 512; otherwise, the method 500 continues to block 518.

At block 518, the method 500 includes stopping data collection and returning control to the command request. In other words, once the valve seating integrity test has finished executing or, for example, the valve positioner 120 receives a subsequent command request specifying a setpoint would open the valve, the valve positioner 120 may return to operating the valve in accordance with the parameters specified in the command request (e.g., ramp rate, scan time, etc.).

At block 520, the method 500 includes comparing the seat profile data to known "good" data. As previously mentioned and further discussed herein, the valve positioner 120 may compare a set of seat profile data against known data sets that are illustrative of a valve seat in proper functioning condition (more generally, any suitable hardware and/or software can be used to conduct this analysis).

At block 522, the method 500 includes determining whether the seat profile data obtained during the most recent valve seating integrity test execution is statistically comparable to the known "good" data, as discussed at block 520. For example, the valve positioner 120 may analyze the seat profile data to compare aspects of the seat profile data to the known "good" data. The valve positioner 120 may analyze the slope, roundness, and/or seat engagement of the closing or opening cycle of the seat profile data and compare those values to the corresponding values of the known "good" data, as discussed herein. Moreover, the valve positioner 120 may analyze the seat profile data to determine if the valve was sticking in the seat, as discussed herein. It should be understood that the valve positioner 120 or other suitable device may analyze any suitable data to determine if the seat profile data is statistically comparable to the known "good" data, and is not expressly limited to the embodiments disclosed herein. If the seat profile data is statistically comparable to the known "good" data, then the method 500 ends; otherwise, the method 500 continues to block 524.

At block 524, the method 500 includes setting an alert. If the method 500 reaches block 524, the valve positioner 120 or other suitable device may have determined, for example, that the valve seat is damaged in some fashion. Thus, the alert may correspond to an indication of the quality of a valve seat (e.g., valve seat 104) or valve trim. Moreover, the valve positioner 120 or other suitable device may send this alert to a user via the workstation 140, so the user may take appropriate action.

Figure 6:
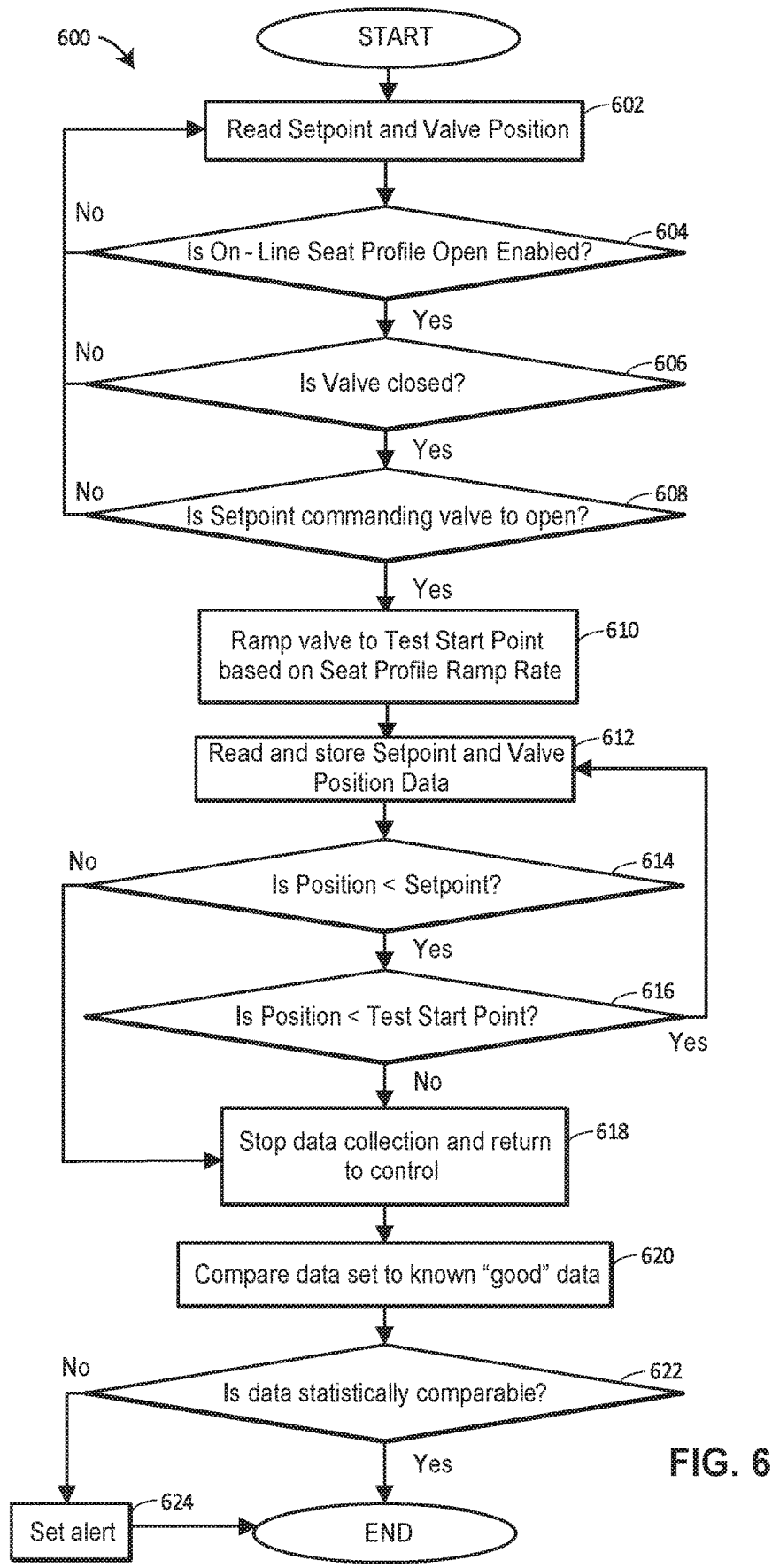
FIG. 6 is a flow diagram of an example method of executing an online test of closing the valve of FIG. 1, in accordance with the principles of the present disclosure.

FIG. 6 is a process flowchart showing another example of a method 600 of executing an online test of opening of a control valve in accordance with the principles of the present disclosure. The method 600 begins at block 602 where the valve positioner 120 reads and stores a setpoint and valve position of the valve. As previously mentioned with reference to FIG. 5, the setpoint may refer to, for example, an ending position of the valve plug based on a command request received by the valve positioner 120. The position sensor 154 measures valve position which may refer to, for example, a current position of the valve plug 106. The valve positioner 120 may collect and store this setpoint and valve position data based on the frequency settings established by the user, for example, in the testing frequency section 412.

At block 604, the method 600 includes determining whether an online seat profile open option is enabled. For example, the valve positioner 120 may check the testing configuration submitted by the user, and more specifically, the options chosen in the enabling section 402. If the opening option was selected, the method 600 continues to block 606; otherwise, the method 600 returns to block 602.

At block 606, the method 600 includes determining if the valve is closed. For example, the valve positioner 120 may obtain a reading from the position sensor 154 to check if the valve is at 0% open. If the valve is closed, the method 600 continues to block 608; otherwise, the method 600 returns to block 602.

At block 608, the method 600 includes determining whether the valve positioner 120 is commanding the valve to open by executing a command request specifying a new setpoint for the valve. For example, the valve positioner 120 may check the command request to determine if the valve positioner 120 is commanding the valve to open based on the current position of the valve and the setpoint specified in the command request. To illustrate, if the valve is currently positioned at 0% open (e.g., closed), and a command request includes a setpoint of 100% open for the valve, the valve positioner 120 would determine the valve positioner 120 is commanding the valve to open by executing the command request specifying the setpoint of 100% open. If the valve positioner 120 is commanding the valve to open, the method 600 continues to block 610; otherwise, the method 600 returns to block 602.

At block 610, the method 600 includes moving the valve to the test start point based on the seat profile ramp rate. As previously mentioned, the valve positioner 120 may obtain the test start point from the test start point section 404 of the testing configuration submitted by the user. Similarly the valve positioner 120 may obtain the seat profile ramp rate from the testing configuration submitted by the user, and more specifically, from the seat profile ramp rate section 406.

To illustrate, at block 610, the valve positioner 120 may execute the command request and simultaneously execute the valve seating integrity test. To get an accurate analysis of the seat profile, the valve positioner 120 may ramp the valve open at the seat profile ramp rate as soon as the valve positioner 120 executes the command request. Once the valve position reaches the test start point, the valve positioner 120 may ramp the valve open further based on the command request and its associated ramp rate. However, it is to be understood that the valve controller may ramp the valve closed prior to and after the valve seating integrity test is complete at any suitable rate.

At block 612, the method 600 includes the valve positioner 120 reading and storing a setpoint and valve position of the valve. Similar to block 602, the valve positioner 120 may obtain the setpoint data from the command request, and the valve position from the position sensor 154.

At block 614, the method 600 includes determining whether the valve position is less than the setpoint. For example, the valve positioner 120 may check the command request to determine if the setpoint included in the command request is less than the current position of the valve. In this way, the valve positioner 120 may check if the command request initially requesting the valve to open is still the operative command request. In other words, if the valve positioner 120 receives a subsequent command request specifying a setpoint that would close the valve while the valve positioner 120 is executing the prior command request (i.e., the command request initially received prior to block 602), the subsequent command request may take priority and the valve seating integrity test may be terminated. If the valve seating integrity test is terminated in this way, the valve positioner 120 may store the data associated with the valve seating integrity test in, for example, the seat profile history 130 of the valve controller's 120 memory 126. The valve positioner 120 may then mark the seat profile data as a terminated valve seating integrity test, and the valve positioner 120 may not conduct an automatic evaluation, as discussed herein, of the seat profile data. If the valve position is less than the setpoint, the method 600 continues to block 616; otherwise, the method 600 continues to block 618.

At block 616, the method 600 includes determining whether the valve position is less than the test start point. For example, the valve positioner 120 may obtain a reading from the position sensor 154 and compare that reading with the test start point, as derived from the test start point section 404. If the valve position is less than the test start point, the method 600 returns to block 612; otherwise, the method 600 continues to block 618.

At block 618, the method 600 includes stopping data collection and returning control to the command request. In other words, once the valve seating integrity test has finished executing or, for example, the valve positioner 120 receives a subsequent command request specifying a setpoint which would close the valve, the valve positioner 120 may return to operating the valve in accordance with the parameters specified in the command request (e.g., ramp rate, scan time, etc.).

At block 620, the method 600 includes comparing the seat profile data to known "good" data. As previously mentioned and further discussed herein, the valve positioner 120 may compare a set of seat profile data against known data sets that are illustrative of a valve seat in proper functioning condition.

At block 622, the method 600 includes determining whether the seat profile data obtained during the most recent valve seating integrity test execution is statistically comparable to the known "good" data, as discussed at block 620. For example, the valve positioner 120 may analyze the seat profile data to compare aspects of the seat profile data to the known "good" data. The valve positioner 120 may analyze the slope, roundness, and/or seat engagement of the closing or opening cycle of the seat profile data and compare those values to the corresponding values of the known "good" data, as discussed herein. Moreover, the valve positioner 120 may analyze the seat profile data to determine if the valve was sticking in the seat, as discussed herein. It should be understood that the valve positioner 120 or other suitable device may analyze any suitable data to determine if the seat profile data is statistically comparable to the known "good" data, and is not expressly limited to the embodiments disclosed herein. If the seat profile data is statistically comparable to the known "good" data, then the method 600 ends; otherwise, the method 600 continues to block 624.

At block 624, the method 600 includes setting an alert. If the method 600 reaches block 624, the valve positioner 120 or other suitable device may have determined, for example, that the valve seat is damaged in some fashion. Thus, the alert may correspond to an indication of the quality of a valve seat (e.g., valve seat 104) or valve trim. Moreover, the valve positioner 120 or other suitable device may send this alert to a user via the workstation 140, so the user may take appropriate action.

It is to be understood, in reference to both FIGS. 5 and 6, that the valve positioner 120 or other suitable device constantly monitors any incoming command requests to account for changes in the desired control of the valve.

Figure 7:
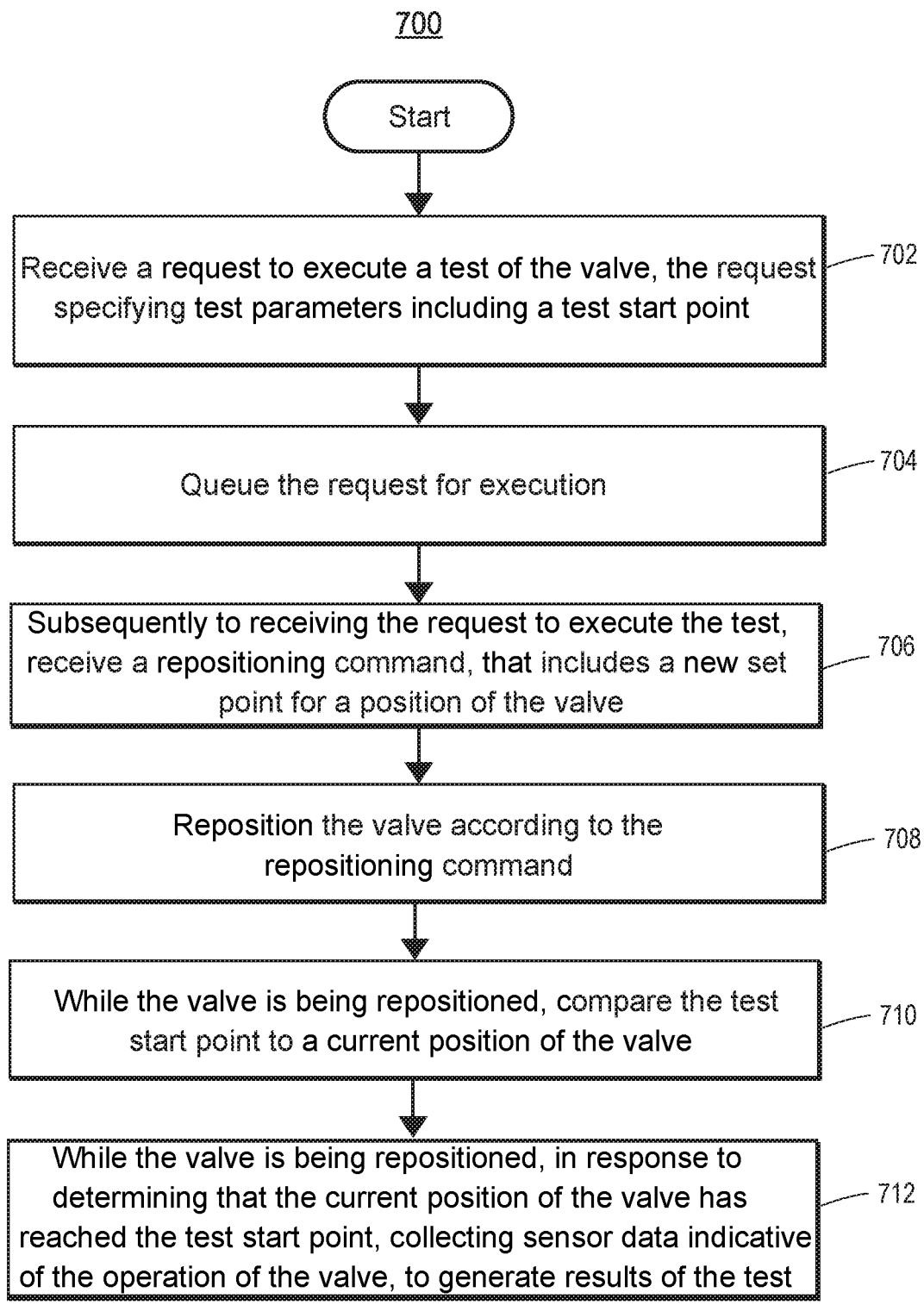
FIG. 7 is a flow diagram of an example method of executing an online test of the valve of FIG. 1 in accordance with the principles of the present disclosure.

FIG. 7 is a process flowchart showing one example of a method 700 in a digital valve positioner of executing an online test of a valve 102 in accordance with the principles of the present disclosure. The method 700 begins at block 702 where, for example, a valve positioner 120 may receive a test request specifying a test start point. The valve positioner 120 may receive the test request from, for example, a workstation 140. A user may have input the test start point using the GUI 400, or other suitable device. In various embodiments, the test request may further specify a ramp rate. In yet other embodiments, the test request may further specify a testing frequency.

At block 704, the method 700 includes queuing the test request for execution. The valve positioner 120 may queue the test request for execution. In various embodiments, the test request may be queued for execution in tandem with a command request. Moreover, the test request may remain in the queue until the valve positioner 120 receives a command request that enables the test to be executed in accordance with, for example, the embodiments exemplified in FIGS. 5 and 6. If the test request remains in the queue for an extended period of time because no command requests arrive fulfilling the requirements, for example, as described in FIGS. 5 and 6, then the valve positioner 120 may send a notification to a user concerning the failure of the valve positioner 120 to execute the test request. Additionally, if a previously queued test request does not execute prior to a user attempting to input a second test request, the valve positioner 120 may reject the second test request and send the user a notification concerning the previously queued test request.

At block 706, the method 700 includes receiving a command request. The valve positioner 120 may receive the command request. The command request may include a setpoint for a position of the valve. In embodiments where the test request is queued for execution in tandem with the command request, the test request may be executed with the command request when either: (i) the command request commands the valve to close based on the setpoint and (ii) the position of the valve is greater than or equal to the test start point; or (i) the command request commands the valve to open based on the setpoint and (ii) the valve is closed. Additionally in these embodiments, the test request may be maintained in the queue if either: (i) the command request commands the valve to close based on the setpoint and (ii) the position of the valve is less than the test start point; or (i) the command request commands the valve to open based on the setpoint and (ii) the valve is not closed.

At block 708, the method 700 includes operating the valve 102 according to the command request. The valve positioner 120 may operate valve 102 according to the command request. In various embodiments, the command request may comprise a first command request, and the setpoint may comprise a first setpoint. Moreover, in these embodiments, executing the test request may further comprise: receiving a second command request, wherein the second command request includes a second setpoint for the position of the valve; and at least one of: ramping the valve closed based on the ramp rate until either of (i) the second command request does not command the valve to close, or (ii) the position of the valve is static; and ramping the valve open based on the ramp rate until the position of the valve is greater than or equal to either of (i) the second setpoint, or (ii) the test start point.

In yet other embodiments, executing the test request may further comprise: canceling the test request and re-queuing the test request for execution according to the testing frequency when the second command request commands the valve to open while ramping the valve closed according to the first command request; and canceling the test request and re-queuing the test request for execution according to the testing frequency when the second command request commands the valve to close while ramping the valve open according to the first command request.

At block 710, the method 700 includes comparing the test start point to the current position of the valve. The valve positioner 120 may compare the test start point to the current position of the valve. In various embodiments, comparing the test start point to the current position of the valve may further comprise: determining at least one of (i) whether the command request commands the valve to close based on the setpoint and (ii) whether the command request commands the valve to open based on the setpoint; and determining at least one of (i) whether the valve is closed and (ii) whether the position of the valve is greater than or equal to the test start point.

In further embodiments, comparing the test start point to the current position of the valve may further include comparing the observed data to stored data to produce a first result. The stored data may represent one or more prior satisfactory test requests, and the first result may include information including at least one of (i) a first slope of the observed data, (ii) a first rounding of the observed data, and (iii) a first seat engagement based on the observed data. Additionally, comparing the test start point to the current position of the valve may further include comparing the observed data to one or more factory norms to produce a second result. The one or more factory norms may represent one or more established satisfactory criteria, and the second result may include information including at least one of (i) a second slope of the observed data, (ii) a second rounding of the observed data, and (iii) a second seat engagement based on the observed data. In these further embodiments, the valve positioner 120 may generate an alert based on the first result or the second result (e.g., to indicate that quality of the valve trim does not satisfy an expectation based on prior test results or a factory norm. valve positioner 120.

At block 712, the method 700 includes observing data indicative of the operation of the valve. The valve positioner 120 may observe data indicative of the operation of the valve (e.g., valve 102). In various embodiments, the observed data may include at least (i) the position of the valve and (ii) pressure (e.g., actuator pressure).

Figure 8:
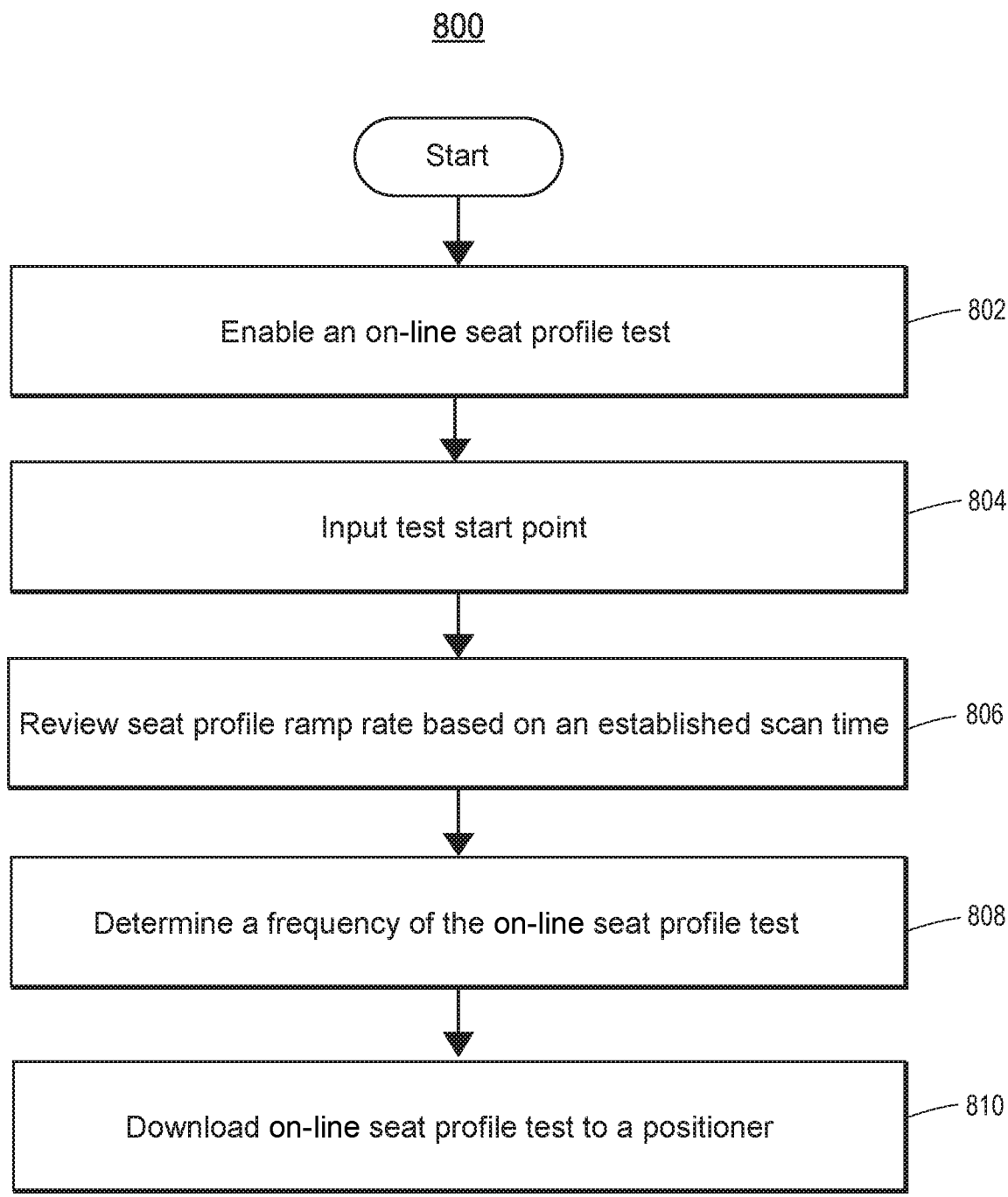
FIG. 8 is a flow diagram of an example method of configuring an online test of the valve of FIG. 1 in accordance with the principles of the present disclosure.

FIG. 8 is a process flowchart showing one example of a method 800 of configuring an online test of a valve 102 in accordance with the principles of the present disclosure. The method 800 begins at block 802 where, for example, a user enables an online valve seating integrity test. At block 804, the method 800 includes inputting a test start point. At block 806, the method 800 includes reviewing the seat profile ramp rate based on an established scan time. At block 808, the method 800 includes determining a frequency of the online valve seating integrity test. At block 810, the method 800 includes downloading the online valve seating integrity test to a positioner. The positioner may be included in a valve positioner 120, or any other suitable device. For example, the positioner may be included in the pneumatic stage 150.

ADDITIONAL CONSIDERATIONS

The foregoing detailed description has been given for clearness of understanding only, and no unnecessary limitations should be understood therefrom, as modifications will be obvious to those skilled in the art. Additionally, throughout this specification, plural instances may implement components, operations, or structures described as a single instance. Although individual operations of one or more methods are illustrated and described as separate operations, one or more of the individual operations may be performed concurrently or may be performed in an alternate order to the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Throughout this specification, actions described as performed by the processor 122 or other similar devices (or routines or instructions executing thereon) generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a non-transitory computer readable medium (i.e., on a memory device). The instructions, when executed by one or more processors of a corresponding device (e.g., a server, a mobile device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software.

The invention claimed is:

1. A method in a digital valve positioner for executing online tests of a valve, the method comprising:
   receiving, by one or more processors, a request to execute a test of the valve, the request specifying test parameters including a test start point;
   queuing the request for execution;

subsequently to receiving the request to execute the test, receiving a new setpoint for the valve wherein the request is queued in tandem with the new setpoint;

repositioning the valve according to the new setpoint; and while the valve is being repositioned:

comparing the test start point to a current position of the valve, including:

determining at least one of (i) whether the new setpoint corresponds to the valve being closed, or (ii) whether the new setpoint corresponds to the valve being open, and determining at least one of (i) whether the valve is closed, or (ii) whether the current position of the valve is greater than or equal to the test start point, and in response to determining that the current position of the valve has reached the test start point, collecting sensor data indicative of the operation of the valve, to generate results of the test.

2. The method of claim 1, further comprising:

executing the request in tandem with repositioning the valve according to the new setpoint when either:

the new setpoint corresponds to the valve being closed and the current position of the valve is greater than or equal to the test start point; or the new setpoint corresponds to the valve being open and the valve is closed; and maintaining the request in the queue if either:

the new setpoint corresponds to the valve being closed and the current position of the valve is less than the test start point; or (i) the new setpoint corresponds to the valve being open and the valve is not closed.

3. The method of claim 2, wherein the request further specifies a ramp rate, the new setpoint is a first new setpoint, and executing the request further comprises:

receiving a second new setpoint for the valve; and at least one of:

ramping the valve closed based on the ramp rate until the current position of the valve is static; and ramping the valve open based on the ramp rate until the current position of the valve is greater than or equal to either of (i) the second new setpoint, or (ii) the test start point.

4. The method of claim 3, wherein the request further specifies a testing frequency, and wherein executing the request further comprises:

when the second new setpoint corresponds to the valve being open, while ramping the valve closed according to the first new setpoint:

canceling the request; and re-queuing the request for execution according to the testing frequency; and when the second the new setpoint corresponds to the valve being closed, while ramping the valve open according to the first new setpoint:

canceling the request; and re-queuing the request for execution according to the testing frequency.

5. The method of claim 1, further comprising at least one of:

comparing the sensor data to stored data to produce a first result, wherein the stored data represents one or more prior satisfactory requests, and wherein the first result includes information including at least one of (i) a first slope of the sensor data, (ii) a first rounding of the sensor data, and (iii) a first seat engagement based on the sensor data; and comparing the sensor data to one or more factory norms to produce a second result, wherein the one or more factory norms represent one or more established satisfactory criteria, and wherein the second result includes information including at least one of (i) a second slope of the sensor data, (ii) a second rounding of the sensor data, and (iii) a second seat engagement based on the sensor data.

6. The method of claim 5, further comprising:

generating an alert based on the first result or the second result, to indicate a quality of the valve trim.

7. The method of claim 1, wherein the sensor data includes at least the current position of the valve and at least one of (i) a pressure and (ii) a force.

8. A system for executing online tests of a valve, the system comprising:

a position sensor configured to measure a current position of the valve; and a digital valve positioner configured to:

receive a request to execute a test of the valve, the request specifying test parameters including a test start point;

queue the request for execution;

subsequently to receiving the request to execute the test, receive a new setpoint for the valve, wherein the request is queued for execution in tandem with the new setpoint;

reposition the valve according to the new setpoint; and while the valve is being repositioned:

compare the test start point to a current position of the valve, including:

determining at least one of (i) whether the new setpoint corresponds to the valve being closed, or (ii) whether the new setpoint corresponds to the valve being open, and determine at least one of (i) whether the valve is closed and (ii) whether the current position of the valve is greater than or equal to the test start point, and in response to determining that the current position of the valve has reached the test start point, collect sensor data indicative of the operation of the valve, to generate results of the test.

9. The system of claim 8, wherein the digital valve positioner is further configured to:

execute the request in tandem repositioning the valve according to the new setpoint when either:

the new setpoint corresponds to the valve being closed based on the new setpoint and the current position of the valve is greater than or equal to the test start point; or the new setpoint corresponds to the valve being open and the valve is closed; and maintain the request in the queue if either:

the new setpoint corresponds to the valve being closed and the current position of the valve is less than the test start point; or the new setpoint corresponds to the valve being open and the valve is not closed.

10. The system of claim 9, wherein the request further specifies a ramp rate, the new setpoint comprises a first new setpoint, and the digital valve positioner is further configured to:

receive a second new setpoint for the valve; and at least one of:
ramp the valve closed based on the ramp rate until the current position of the valve is static; and
ramp the valve open based on the ramp rate until the current position of the valve is greater than or equal to either of (i) the second new setpoint, or (ii) the test start point.

11. The system of claim 10, wherein the request further specifies a testing frequency, and wherein the digital valve positioner is further configured to:
when the new setpoint corresponds to the valve being open, while ramping the valve closed according to the first new setpoint:
cancel the request; and
re-queue the request for execution according to the testing frequency; and
when the new setpoint corresponds to the valve being closed, while ramping the valve open according to the first new setpoint:
cancel the request; and
re-queue the request for execution according to the testing frequency.

12. The system of claim 8, wherein the digital valve positioner is further configured to:
at least one of:
compare the sensor data to stored data to produce a first result, wherein the stored data represents one or more prior satisfactory requests, and wherein the first result includes information including at least one of (i) a first slope of the sensor data, (ii) a first rounding of the sensor data, and (iii) a first seat engagement based on the sensor data; and
compare the sensor data to one or more factory norms to produce a second result, wherein the one or more factory norms represent one or more established satisfactory criteria, and wherein the second result includes information including at least one of (i) a second slope of the sensor data, (ii) a second rounding of the sensor data, and (iii) a second seat engagement based on the sensor data; and
at least one of:
generate an alert based on the first result or the second result, to indicate a quality of the valve trim.

13. The system of claim 8, further comprising at least one of (i) a pressure sensor configured to measure pressure and (ii) a load cell configured to measure force, and wherein the digital valve positioner is further configured to process data indicative of the operation of the valve including at least the current position of the valve and at least one of (i) the pressure and (ii) the force.

14. A computer readable storage medium comprising non-transitory computer readable instructions thereon for executing online valve seating integrity tests of a valve, wherein the instructions when executed on one or more processors cause the one or more processors to:
receive a request to execute a test of the valve, the request specifying test parameters including a test start point;
queue the request for execution;
subsequently to receiving the request to execute the test, receive a new setpoint for the valve, wherein the request is queued for execution in tandem with the new setpoint;
reposition the valve according to the new setpoint;
while the valve is being repositioned:
compare the test start point to a current position of the valve, including:
determining at least one of (i) whether the new setpoint corresponds to the valve being closed, or (ii) whether the new setpoint corresponds to the valve being open, and
determining at least one of (i) whether the valve is closed, or (ii) whether the current position of the valve is greater than or equal to the test start point, and
in response to determining that the current position of the valve has reached the test start point, collect sensor data indicative of the operation of the valve, to generate results of the test.

15. The computer readable storage medium of claim 14, wherein the instructions when executed on the one or more processors further cause the one or more processors to:
execute the request in tandem with repositioning valve according to the new setpoint:
the new setpoint corresponds to the valve being closed and the current position of the valve is greater than or equal to the test start point; or
the new setpoint corresponds to the valve being open and the valve is closed; and
maintain the request in the queue if either:
the new setpoint corresponds to the valve being closed and the current position of the valve is less than the test start point; or
the new setpoint corresponds to the valve being closed and the valve is not closed.

16. The computer readable storage medium of claim 15, wherein the request further specifies a ramp rate, the new setpoint comprises a first new setpoint, and the instructions when executed on the one or more processors further cause the one or more processors to:
receive a second new setpoint for the current position of the valve; and
at least one of:
ramp the valve closed based on the ramp rate until either the current position of the valve is static; and
ramp the valve open based on the ramp rate until the current position of the valve is greater than or equal to either of (i) the second new setpoint, or (ii) the test start point.

17. The computer readable storage medium of claim 16, wherein the request further specifies a testing frequency, and wherein the instructions when executed on the one or more processors further cause the one or more processors to:
when the second new setpoint corresponds to the valve being closed, while ramping the valve closed according to the first new setpoint:
cancel the request; and
re-queue the request for execution according to the testing frequency; and
when the second new setpoint corresponds to the valve being closed, while ramping the valve open according to the first new setpoint:
cancel the request; and
re-queue the request for execution according to the testing frequency.

18. The computer readable storage medium of claim 14, wherein the instructions when executed on the one or more processors further cause the one or more processors to:
at least one of:
compare the sensor data to stored data to produce a first result, wherein the stored data represents one or more prior satisfactory requests, and wherein the first result includes information including at least one of (i) a first slope of the sensor data, (ii) a first rounding of the sensor data, and (iii) a first seat engagement based on the sensor data; and compare the sensor data to one or more factory norms to produce a second result, wherein the one or more factory norms represent one or more established satisfactory criteria, and wherein the second result includes information including at least one of (i) a second slope of the sensor data, (ii) a second rounding of the sensor data, and (iii) a second seat engagement based on the sensor data; and at least one of:
generate an alert based on the first result or the second result to indicate a quality of a valve trim; and
generate a second alert based on the second result, wherein the second alert indicates a second quality of the valve trim.

19. The computer readable storage medium of claim 14, wherein the instructions when executed on the one or more processors further cause the one or more processors to observe data indicative of the operation of the valve including at least the current position of the valve and at least one of (i) a pressure and (ii) a force.

* * * * *

UNITED STATES PATENT AND TRADEMARK OFFICE
CERTIFICATE OF CORRECTION

Page 1 of 1

PATENT NO. : 11,835,152 B2
APPLICATION NO. : 16/836519
DATED : December 5, 2023
INVENTOR(S) : John S. Fuller It is certified that error appears in the above-identified patent and that said Letters Patent is hereby corrected as shown below:

In the Specification

Column 1, Line 7, "and, and" should be -- and --.

Column 1, Line 67, "be" should be -- to be --.

Column 4, Line 21, "disclosure." should be -- disclosure; --.

Column 4, Line 24, "disclosure." should be -- disclosure; --.

Column 4, Line 27, "disclosure." should be -- disclosure; and --.

Column 5, Line 36, "the" should be -- with the --.

Column 7, Lines 63-67, "pressure readings, is an........106 movement." should be at Line 62, after "position and", as a continuation paragraph.

Column 9, Line 51, ""damaged."." should be -- "damaged". --.

Column 17, Line 39, "(e.g.," should be -- e.g., --.

Column 17, Line 41, "norm." should be -- norm of the --.

In the Claims

Column 19, Line 56, "the new" should be -- new --.

Signed and Sealed this
Twenty-ninth Day of April, 2025

Coke Morgan Stewart
*Acting Director of the United States Patent and Trademark Office*